(No Model.)
W. R. PATTERSON.
TELEGRAPHIC CABLE.
No. 296,774. Patented Apr. 15, 1884.
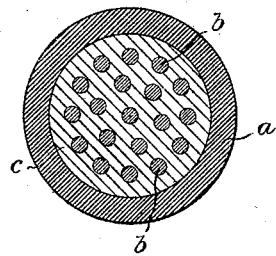
WITNESSES
Wm A. Skinkle
Robt E Nash
INVENTOR
William R. Patterson.
By his Attorneys
Baldwin, Hopkins, & Peyton.

UNITED STATES PATENT OFFICE.

WILLIAM R. PATTERSON, OF CHICAGO, ILLINOIS, ASSIGNOR, BY MESNE ASSIGNMENTS, TO THE WESTERN ELECTRIC COMPANY, OF SAME PLACE.

TELEGRAPHIC CABLE.

SPECIFICATION forming part of Letters Patent No. 296,774, dated April 15, 1884.

Application filed December 5, 1881. (No model.)

*To all whom it may concern:*

Be it known that I, WILLIAM R. PATTERSON, of Chicago, Illinois, have invented certain new and useful Improvements in Telegraphic Cables, of which the following is a full, clear, concise, and exact description.

My invention relates to that class of telegraphic cables in which a core of insulated conductors is protected by a metallic sheathing or pipe. The pipe should be light, flexible, hard, and tough. Iron pipe and lead pipe have been heretofore largely used for this purpose, but they are both found objectionable. The iron is hard and tenacious, but is not flexible. It must therefore be laid section by section. Lead pipe is flexible, and on this account is very desirable, as it may be readily coiled after the core of conductors is drawn into it, and the pipe with the inclosed core may be placed in an oven, so as to be kept warm while melted paraffine charged with gas is forced into it. But lead pipe, even though it be handled with the greatest care, is liable to be punctured or flattened and otherwise distorted.

It is well known in the arts that an alloy of lead and tin is tougher than either metal alone; and I am aware that it has been proposed indefinitely, without stating the way, to cover uninsulated wire with an alloy of lead and tin, and also to employ wire covered with lead and tin as a sheathing (which of course must be a mere wound serving) for electric cables; but I employ a peculiar pipe of an alloy of lead and tin; and I have discovered that the lead and tin must be combined in proportions within certain limits in order to form a hard and tenacious pipe within which the core of conductors may be drawn, and which shall possess enough flexibility to permit it to be coiled when it is desired to heat the pipe and its contained core while introducing the gas-charged paraffine. By experiment I have ascertained that as a sheathing for electric cables a mixture of from ninety to ninety-seven parts of lead to from ten to three parts of tin produces an alloy which is superior to lead alone, or to any other mixture of lead and tin outside of these limits. A pipe having more than ten per cent. of tin is not sufficiently flexible to be coiled and uncoiled as required, and when the proportion of tin is reduced below three per cent. the pipe becomes too soft to retain its cylindrical form. For aerial cables whose lightness and tenacity are of the greatest importance, I make the pipe somewhat thinner and harder than that employed in underground or submarine cables, preferably using about six per cent. of tin to ninety-four per cent. of lead. For underground or submarine telegraph cables, where thicker pipe is desirable, and where the pipe is protected by a flexible armor of wires wound spirally, I use from three to five per cent. of tin to ninety-seven or ninety-five of lead.

Telegraph-cables in which my improved sheathing-pipe is used may be coiled with as great facility as ordinary lead pipe, and may afterward be easily uncoiled without injury.

In the accompanying drawings I have illustrated my improved telegraphic cable.

*a* indicates the pipe, composed of the alloys of lead and tin in the proportions above designated; *b*, the core of insulated conductors, and *c* the gas-charged paraffine.

I claim as my invention—

An improved telegraphic cable formed by the combination, substantially as set forth, of a core of electrical conductors and a sheathing consisting of a pipe composed of an alloy of lead and tin in proportions varying from ninety to ninety-seven parts of lead to from three to ten parts of tin.

WILLIAM R. PATTERSON.

Witnesses:
 WILLIAM S. GRANGER,
 GEORGE P. BARTON.